CAPACITOR OPERATED SCR SWITCHING CIRCUIT

Filed June 9, 1964 3 Sheets-Sheet 1

INVENTOR.
Thomas E. Myers,
BY Parker & Carter
Attorneys.

INVENTOR.
Thomas E. Myers,
BY Parker & Carter
Attorneys.

CAPACITOR OPERATED SCR SWITCHING CIRCUIT

Filed June 9, 1964 3 Sheets-Sheet 3

INVENTOR.
Thomas E. Myers,
BY Parker & Carter
Attorneys.

United States Patent Office 3,329,838

Patented July 4, 1967

3,329,838
CAPACITOR OPERATED SCR SWITCHING CIRCUIT

Thomas E. Myers, St. Charles, Ill., assignor to Ideal Industries, Inc., Sycamore, Ill., a corporation of Delaware Filed June 9, 1964, Ser. No. 373,801
5 Claims. (Cl. 307—125)

This invention relates to a control or switching circuit and in particular to such a circuit which may be operated by human contact with an antenna.

A primary purpose of the invention is a circuit of the type described utilizing a silicon controlled rectifier with cut-off of the rectifier being caused by the initial negative portion of the oscillations caused by a capacitor discharging through a series connected coil.

Another purpose is a simplified touch control circuit which may be operated with one or more touch surfaces.

Another purpose is an inexpensive reliable touch control circuit.

Another purpose is a control circuit utilizing a capacitor discharge to energize a relay coil.

Another purpose is a control circuit of the type described utilizing a capacitor discharge into an LC series circuit to provide positive cut-off of a silicon controlled rectifier.

Another purpose is a method of operating a gated series conductor rectifier through a series connected LC circuit.

Other purposes will appear in the ensuing specification, drawings and claims.

The invention is illustrated diagrammatically in the following drawings wherein.

The invention may be described generally as a control circuit suitable for actuating a relay coil whose contacts perform a control function. The signal for actuating the circuit may come from an antenna. The antenna may have a surface positioned for and adapted for human contact so that the potential of the body applied to the antenna is sufficient to operate the circuit. In the alternative, there may be two adjacent antennas positioned such that human contact bridges or shorts the two antennas together to thereby connect a previously established source of voltage to operate the circuit.

In still another form of operation, human contact at the touch surface may be effective through a momentary contact shorting arrangement to apply a predetermined voltage to an antenna to operate the circuit. Such a circuit would be particularly useful when the person contacting the touch surface is wearing gloves. In another form of operation, there may be a number of separate antennas positioned at different points, with the application of a potential to any one of these antennas being sufficient to operate the circuit. For example, it may be desirable to turn on an electric light from any one of a number of different locations. Each location would have an antenna and the antennas would all connect to a common point so that the application of a potential to any one of the antennas would be effective to turn on an electric light or perform some other type of control function.

In each of the circuits shown and described herein, there is a relay coil. The relay coil may be a part of a latching relay or any other type of relay. Latching relays are desirable in some applications, but the circuit has broader application. A latching relay, holding relay, or any other type of relay which requires current for energization may be used. Also, the coil in the circuit need not be a relay coil. In the broadest sense the invention relates to a control member having a coil and controlled contacts.

The circuits shown may operate satisfactorily with one antenna or with two antennas. In some applications, particularly in damp areas of a home, a second antenna is desirable. When two antennas are used, they may be located quite close together. This is to be distinguished from the application which is basically a single antenna application, but which has many antennas in parallel.

Figure 1:
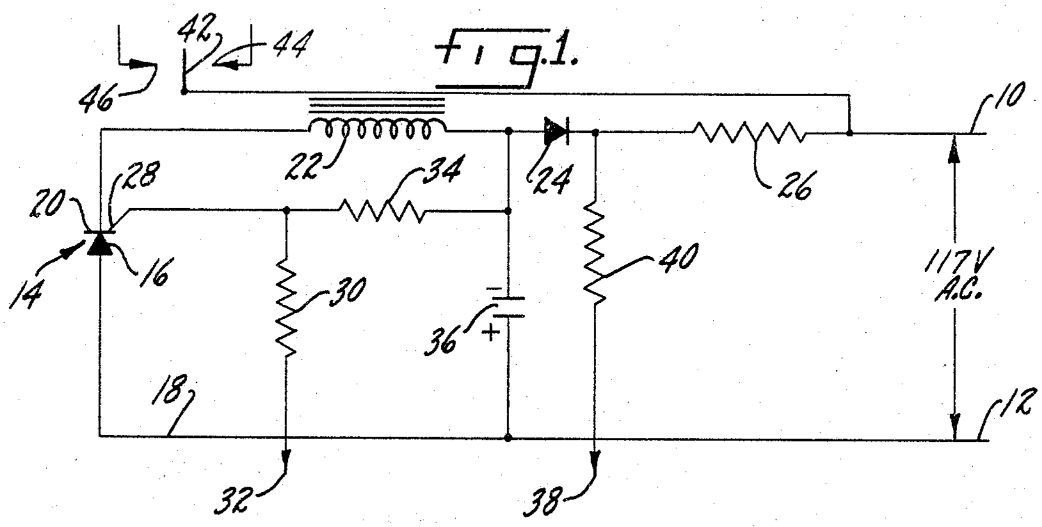
FIGURE 1 is a circuit diagram of one form of control circuit.

In FIGURE 1, lines 10 and 12 may be connected to a suitable source of power, for example 117 volts A.C., as is conventional in home wiring. A silicon controlled rectifier or SCR 14 may have its anode 16 connected by line 18 to one side of the A.C. source. The cathode 20 may be connected to relay coil 22 which is connected to a rectifier 24. The cathode of rectifier 24 is connected through a suitable resistance 26 to the other side of the A.C. source. Gate 28 of the rectifier 14 may be connected through a suitable high resistance 30 to one antenna 32. Gate 28 is also connected through a resistance 34 to the anode of rectifier 24 and to one side of a capacitor 36. A second antenna 38 is connected through a suitable high resistance 40 to a point between the cathode of rectifier 24 and resistance 26. An armature 42 may be positioned to move back and forth between contacts 44 and 46 as coil 22 is energized.

The A.C. supply voltage for the circuit of FIGURE 1 will cause capacitor 36 to charge up, in the polarity indicated, at a rate determined by the size of resistor 26. Thereafter, whenever antennas 32 and 38 are shorted together, the negative bias provided on the gate by resistor 34 will be overcome such that SCR 14 will conduct. Capacitor 36 will then discharge through rectifier 14 and a pulse of current will pass through coil 22 of the relay. This pulse of current will be sufficient for operation of the relay. The circuit shown in FIGURE 1 has the advantage that there will be no repeat or false firing because when the SCR conducts, the potential of capacitor 36 drops to zero and there is no other current available for operating the relay. Also, the discharge of capacitor 36 through coil 22 will cause a damped oscillating current through SCR 14. The initial negative portion of the oscillating current will cut off the SCR. The size of resistances 30 and 40 will be set to protect a person touching contact surfaces 32 and 38.

Figure 2:
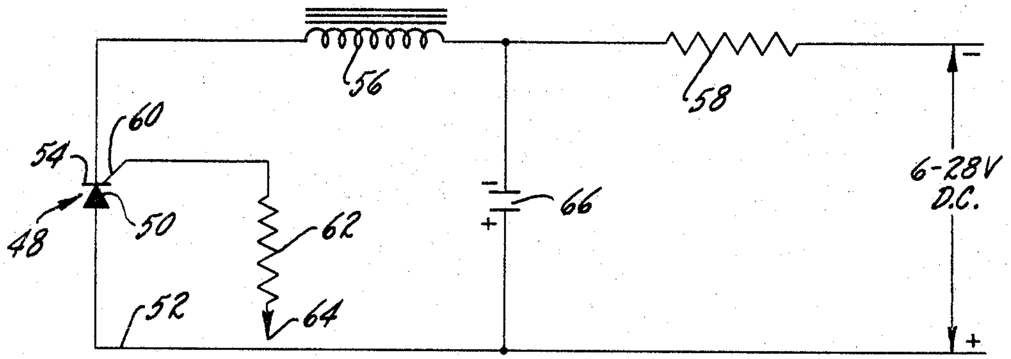
FIGURE 2 is a circuit diagram of a second form of control circuit.

FIGURE 2 illustrates a further type of control circuit utilizing a capacitor discharge to energize a relay coil. An SCR 48 may have its anode 50 connected by line 52 to one side of a suitable DC source, for example between 6 and 28 volts. The cathode 54 of the rectifier 48 may be connected to coil 56 of a suitable latching relay with the opposite side of the coil being connected through a resistance 58 to the other side of the DC source. Gate 60 of the rectifier 48 may be connected through a suitable high resistance 62 to an antenna 64. A capacitor 66 is connected across the DC source and will charge up to the value of the DC source with the polarity indicated.

In operation, capacitor 66 will charge in a time determined by the size of resistor 58. As soon as a potential is applied to antenna surface 64 through human contact or otherwise, SCR 48 will conduct and the capacitor will discharge through the coil 56 of the relay. The pulse of current passing through the coil will be sufficient to operate it. The DC source by itself will not provide sufficient current to operate the relay as resistor 58 is sufficiently large to reduce source current. The capacitor alone provides the operating current for the relay. There will be no false firing of the relay because as soon as the capacitor has reached zero potential there will no longer be sufficient current flowing through the relay to operate it and there can be no further pulse until the capacitor has recharged. Also, as described above, the negative portion of the oscillations caused by the capacitor discharge will cause a positive cut-off.

Figure 3:
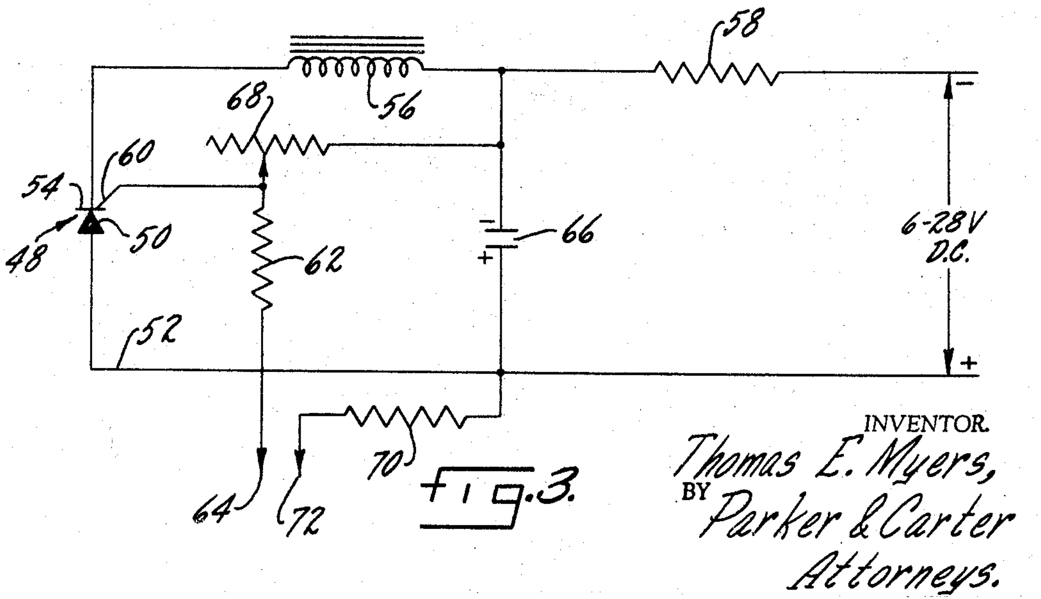
FIGURE 3 is a circuit diagram of a third form of control circuit.

The circuit shown in FIGURE 3 is substantially the same as that of FIGURE 2 and like numbers have been given to like parts. Gate 60 of SCR 48 is connected to a biasing resistor 68 with the biasing resistor being connected through resistor 58 to the source. A second antenna 72 is connected by resistor 70 to one side of capacitor 66. The operation of the circuit in FIGURE 3 is substantially the same as the circuit in FIGURE 2 and the negative bias provided by resistor 68 merely provides additional assurance that there will be no false firing of the SCR 48.

Figure 4:
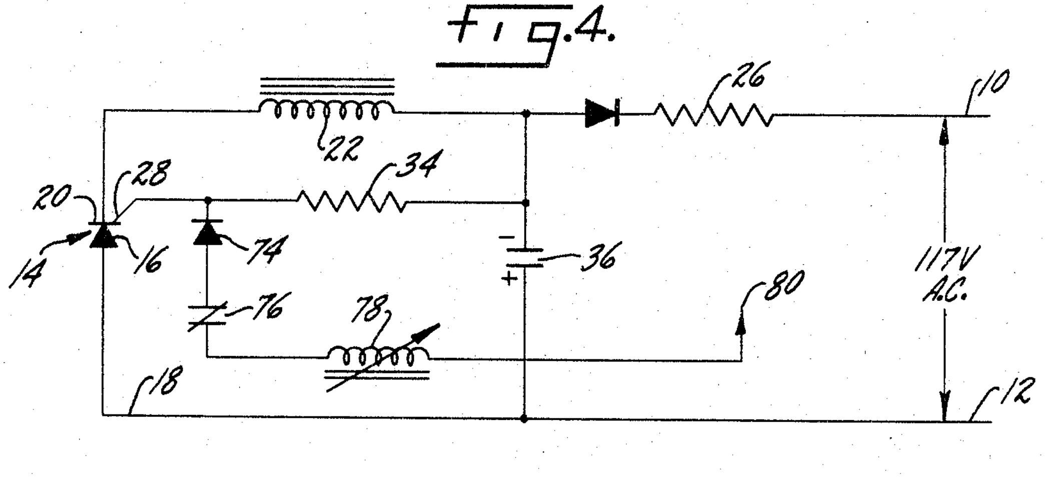
FIGURE 4 is a circuit diagram of a fourth form of control circuit.

FIGURE 4 illustrates a circuit substantially the same as that in FIGURE 1 with the exception that resistor 30 has been replaced by a series resonant circuit. Like numbers have been given to like parts in the circuits of FIGURES 1 and 4. A rectifier 74 may be connected directly to gate 28 of the SCR 14. A variable capacitor 76 is connected to the anode of rectifier 74 and a variable coil 78 is connected to the capacitor 76. When antenna 80 receives, for example, from a remote transmitter, a signal at the same frequency as that to which the series resonant circuit is tuned, then a sufficient voltage will be applied to the gate 28 of the rectifier 14 to operate it. Capacitor 36 will then discharge in the same manner as described in connection with FIGURE 1. The only difference between FIGURES 1 and 4 is the fact that the circuit of FIGURE 4 can be energized from a remote transmitter so that it is not necessary to physically touch a contact surface to operate the relay.

Figure 5:
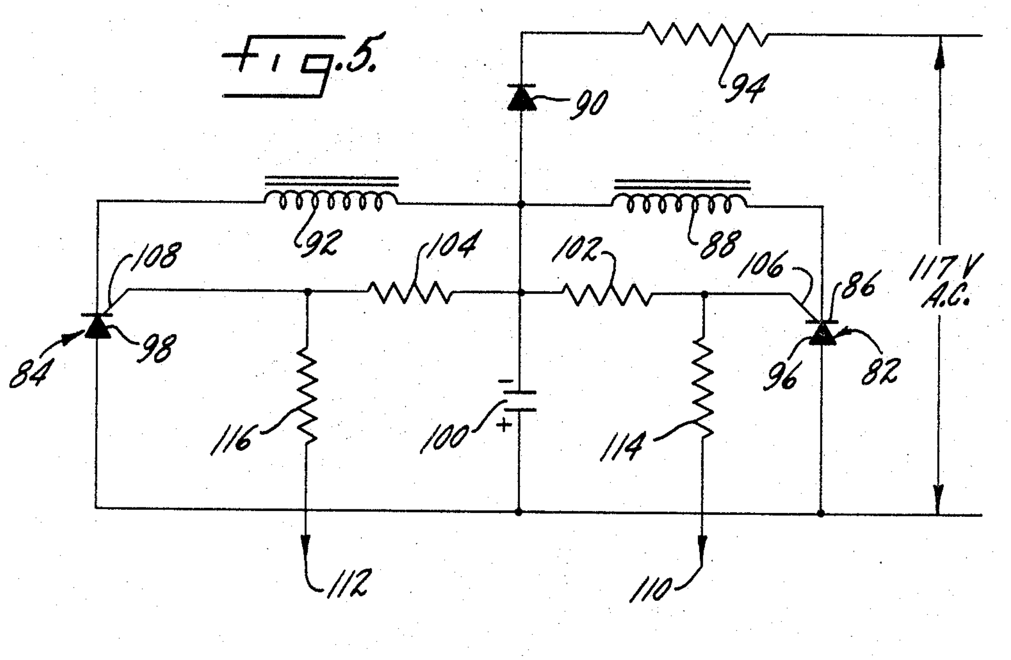
FIGURE 5 is a circuit diagram of a fifth form of control circuit.

In FIGURE 5 there are a pair of silicon controlled rectifiers 82 and 84. The cathode 86 of SCR 82 is connected through a coil 88 to a diode 90. The cathode of SCR 84 is connected through a coil 92 to diode 90. Coils 88 and 92 may be the operating coils of a relay with each coil being arranged to move a contact or armature in a different direction. Diode 90 is connected through a resistor 94 to one side of a suitable 117-volt AC source of power. The anodes 96 and 98 of SCR's 82 and 84 are connected together and to the other side of the voltage source. A capacitor 100 is connected to the common anode connection and to the common connection of the coils 88 and 92. Capacitor 100 is also connected through bias resistors 102 and 104 to the gates 106 and 108 of SCR's 82 and 84 respectively. Antennas 110 and 112 are connected through current limiting resistors 114 and 116 to gates 106 and 108. A common antenna may be added which would connect to the ground side of the line so that both sides of the circuit could operate in the manner of FIGURE 1.

The capacitor 100 will charge up to a value determined by the size of the voltage source and in a time determined by resistor 94. When an electric potential is applied to antenna 110, SCR 86 will conduct and capacitor 100 will discharge through the series circuit formed by the SCR and coil 88. The operation is identical when antenna 112 receives an electric potential whether it be by human contact or otherwise. In this case, SCR 84 will conduct and coil 92 will be energized. The relay contacts will be moved to a second position. In effect, the circuit of FIGURE 5 is a bistable multivibrator. Instead of a latching relay there is a relay with two separate coils with each coil moving an armature to a different position. The two antennas are in effect the "on" or "off" buttons of the switch.

The method by which the SCR's in the various circuits are cut off or placed in a non-conductive state is important.

The SCR is cut off by means of an oscillating damped-out current. The SCR is in a tank circuit formed by a series capacitor and coil. The initial negative portion of the oscillating current will place the SCR in a non-conductive condition, but because the current is being rapidly damped out, there is little possibility of relay chatter.

Figure 6:
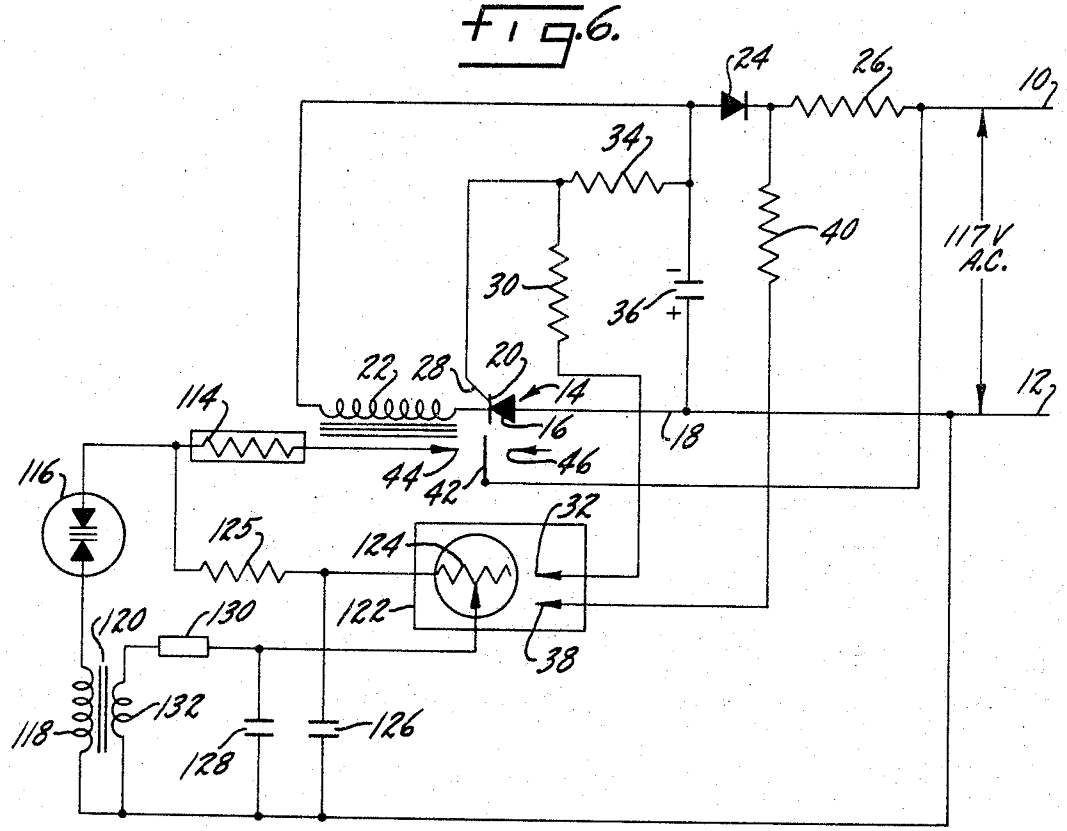
FIGURE 6 is a circuit diagram illustrating one use of the control circuit of FIGURE 1.

FIGURE 6 illustrates one use of control circuits of the type described. In this case, the circuit of FIGURE 1 has been used to operate a load, which may be an elecric light, or any other type of electric load. Like numbers have been given to like parts in the circuits of FIGURES 1 and 6. Contact 44 may be connected to a load which, as shown herein, is a resistor 114. Resistor 114 is connected to a semiconductor or silicon biswitch 116 of the type manufactured by Transitron Electronic Corporation, Wakefield, Mass. The biswitch 116 is connected through the secondary coil 118 of a torroid 120 and then to line 12. When armature 42 has been moved to contact 44 the load 114, the biswitch 116 and the secondary 118 of the torroid are across the line.

Antennas 32 and 38 may be mounted on a suitable plate or the like 122 with the plate also mounting a variable resistor 124. One end of resistor 124 is connected through a resistor 125 to the load 114 and to a phase shifting capacitor 126. The other end of resistor 124 is connected to a phase shifting capacitor 128 and to a trigger diode 130. The trigger diode is connected to the primary 132 of the torroid 120. One side of the primary 122 of the torroid is connected in common with capacitors 126 and 128 and to the secondary of the torroid.

In operation, when armature 42 moves to contact 44, initially the biswitch 116 will not be opened. As the voltage of the applied sine wave from the line increases on the positive side ultimately there will be sufficient voltage to cause operation of the trigger diode which will permit current flow through the primary 132 of the torroid. The peak of current passing through the primary of the torroid is amplified and this peak opens the biswitch 116 to connect the load across the line. The time interval between initiation of the positive half of the sine wave and conduction of the trigger diode is determined by the setting of resistor 124. The combination of capacitor 126 in parallel with the series combination of resistor 124 and capacitor 128 provides a phase shifting network. The negative portion of the sine wave has the same effect and again there will be current passing through the load for a predetermined time of the negative half cycle with this time period being determined by the setting of resistor 124.

If the load is a light the effect of the circuit operation is to dim the light with the amount of light or the amount of dimness being determined by the period of time in which current flows through the load during each half cycle of line current.

The use, operation and function of the invention are as follows:

Control circuits of the type described have a variety of applications. One application is in turning lights on and off in the home or in operating a light dimmer. The present circuits are designed for such an application, but the principles disclosed herein are readily applicable to other types of circuits in which it is desired to connect a load to a source of power by means of the human body touching control surfaces. The type of load and the source of power may vary widely.

When using a single touch surface or antenna, the application of a small amount of voltage, either AC or DC, from the human body will apply a signal to the gate of the silicon controlled rectifier. The gates, in any of the circuits shown, may be biased below cut-off by means of a suitable biasing resistor, although this is not necessary. Application of a voltage from a single touch surface will permit the silicon controlled rectifier to conduct and to energize the coil of the relay connected thereto.

The operation of a circuit utilizing two contact surfaces is somewhat the same. In order to operate such a circuit, both surfaces must be contacted by a person at the same time. The resistors normally in series with the contact surfaces are of a sufficient size, for example 10 megohms or the like, to protect the person contacting the touch surfaces from any possible shock due to line voltage. Touching of the surfaces provides a signal to the gate of the silicon controlled rectifier to open the rectifier and permit the coil to be energized. The armature of the relay will then move as described.

When using two touch surfaces, it is not necessarily the potential of the body that is applied to the gate. Rather it is the potential from the line applied through current limiting resistors and that portion of the body touching the contact surfaces, which is effective to overcome the negative bias applied to the gate.

In some applications, a further bias may be supplied betweeen the anode and gate. This bias which may be termed bias to conduct, as against bias to cut off from the cathode, provides increased sensitivity.

Although a silicon controlled rectifier has been specified, other solid state rectifiers may also be satisfactory.

The invention should not be limited to operating latching type relays. As can be seen, the particular circuits shown can be utilized to energize any coil or to operate any type of relay.

In any of the circuits shown, the hot side of the line may be connected to either the anode or cathode of the SCR. When the cathode is connected to the hot side, the rectifier is more gate sensitive as the gate has a higher impedance to ground.

An important feature of the invention is the automatically regulated cut-off bias on the gate of the SCR. For example, in FIGURE 1, capacitor 36 will charge to a value above the RMS value of source voltage. The negative side of the capacitor is connected to the gate and thus the negative voltage on the gate will always be sufficient to overcome the RMS voltage across the SCR. The charge on the capacitor will follow any changes in source voltage so that the cut-off bias is automatically regulating.

Any number of antennas may be connected to the same SCR for operation from a variety of remote locations. At each location, the antenna may receive a potential from the human body or from a momentary contact shorting arrangement.

Whereas the preferred form of the invention has been shown and described herein, it should be realized that there are many modifications, substitutions and alterations thereto within the scope of the following claims.

I claim:

1. In a control circuit for connection to an AC source of power, a control member having contacts for performing a control function and coil, a silicon controlled rectifier having an anode, cathode and gate, a capacitor in closed loop circuit with said coil and rectifier, with said capacitor being connected across said source, a rectifier between one side of said capacitor and said source anode and cathode, an antenna connected to said rectifier gate, the application of an electric potential to said antenna being effective to provide a signal on the rectifier gate to cause the rectifier to operate, operation of said rectifier permitting said capacitor to discharge through said coil and rectifier, the negative portion of the oscillating current produced by the capacitor discharge being effective to cut off the rectifier, and a secondary circuit, said contacts being effective to connect said secondary circuit across said source, said secondary circuit including a load and a bidirectional switch in series with said source and contacts, and means connected in circuit with said bidirectional switch for causing its operation during a portion of each cycle of the AC source.

2. The circuit of claim 1 further characterized by and including a high resistance connection between said antenna and rectifier gate.

3. The circuit of claim 2 further characterized by and including a second antenna and a high resistance connection between said second antenna and one side of said capacitor.

4. The circuit of claim 2 further characterized by a a second antenna and a high resistance connection between said second antenna and the source side of said last-named rectifier.

5. The circuit of claim 1 further characterized in that the means connected in circuit with said bidirectional switch comprise a phase shifting circuit having a capacitor and a variable resistance.

References Cited

UNITED STATES PATENTS

| | | | |
|---|---|---|---|
| 2,247,246 | 6/1941 | Lindsay et al. | |
| 2,896,131 | 7/1959 | Schumann. | |
| 2,946,956 | 7/1960 | Bradley. | |
| 3,045,148 | 7/1962 | McNulty et al. | 317—148.52 |
| 3,144,592 | 8/1964 | Leeds et al. | 317—148.52 |
| 3,171,066 | 2/1965 | Atkins et al. | |
| 3,213,323 | 10/1965 | Circle. | |
| 3,217,174 | 11/1965 | Barringer et al. | 307—88.5 X |
| 3,286,134 | 11/1966 | Myers | 307—116 X |

ORIS L. RADER, *Primary Examiner.*

T. B. JOIKE, *Assistant Examiner.*